United States Patent
Hagemann et al.

(10) Patent No.: US 10,150,324 B2
(45) Date of Patent: Dec. 11, 2018

(54) METHOD FOR PRODUCING A SECURITY AND/OR VALUABLE DOCUMENT WITH PERSONALIZED INFORMATION

(71) Applicants: Bundesdruckerei GmbH, Berlin (DE); Bayer Material Science AG, Leverkusen (DE)

(72) Inventors: Michael Hagemann, Berlin (DE); Arthur Mathea, Berlin (DE); Oliver Muth, Berlin (DE); Malte Pflughoefft, Berlin (DE); Jorg Fischer, Berlin (DE); Heinz Pudleiner, Krefeld (DE)

(73) Assignees: Bundesdruckerei GmbH, Berlin (DE); Bayer Material Science AG, Leverkusen (DE)

( * ) Notice: Subject to any disclaimer, the term of this patent is extended or adjusted under 35 U.S.C. 154(b) by 0 days.

(21) Appl. No.: 15/412,218

(22) Filed: Jan. 23, 2017

(65) Prior Publication Data
US 2017/0129271 A1 May 11, 2017

Related U.S. Application Data

(63) Continuation of application No. 14/662,651, filed on Mar. 19, 2015, now abandoned, which is a
(Continued)

(30) Foreign Application Priority Data

Dec. 7, 2007 (DE) .......... 10 2007 059 746

(51) Int. Cl.
C23C 26/00 (2006.01)
B42D 25/305 (2014.01)
(Continued)

(52) U.S. Cl.
CPC ............. *B42D 25/305* (2014.10); *B32B 27/00* (2013.01); *B32B 27/08* (2013.01); *B32B 37/06* (2013.01);
(Continued)

(58) Field of Classification Search
CPC .... B42D 25/30; B42D 25/305; B42D 25/378; B42D 25/455
See application file for complete search history.

(56) References Cited

U.S. PATENT DOCUMENTS 2,970,131 A 1/1961 Moyer et al.
2,991,273 A 7/1961 Hechelhammer et al.
(Continued)

FOREIGN PATENT DOCUMENTS

DE 1570703 2/1970
DE 2063050 7/1972
(Continued)

OTHER PUBLICATIONS

"Chemistry and Physics of Polycarbonates", Hermann Schnell, Interscience Publishers, 1964, pp. 27-98.
(Continued)

*Primary Examiner* — Kelly M Gambetta
(74) *Attorney, Agent, or Firm* — Stuart H. Mayer; Mayer & Williams PC

(57) ABSTRACT

The invention relates to a method for producing a security and/or valuable document containing a polymer layer composite or consisting thereof, said polymer layer composite being formed from a polymer layer partial composite and a polymer cover layer and the polymer layer partial composite and/or the polymer cover layer containing a laser sensitive component, consisting of the followings steps: A) first personalized information is applied to the polymer layer partial composite by means of an inkjet printing method as
(Continued)

a colored inkjet printed layer, B) the polymer cover layer is applied to the inkjet printed layer and is joined to the polymer layer partial composite by thermal lamination, and C) second personalized information is inscribed into the polymer layer composite of the security and/or valuable document, obtained in step B), by means of laser engraving. The invention also relates to a security and/or valuable document that can be produced according to said method.

12 Claims, 4 Drawing Sheets

Related U.S. Application Data continuation of application No. 13/799,430, filed on Mar. 13, 2013, now abandoned, which is a continuation-in-part of application No. 12/746,637, filed as application No. PCT/DE2008/002014 on Dec. 8, 2008, now abandoned.

(51) Int. Cl.

| | |
|---|---|
| B42D 25/378 | (2014.01) |
| B42D 25/455 | (2014.01) |
| B41M 3/14 | (2006.01) |
| B41M 5/00 | (2006.01) |
| B41M 5/24 | (2006.01) |
| B42D 25/41 | (2014.01) |
| B42D 25/309 | (2014.01) |
| B42D 25/29 | (2014.01) |
| B42D 25/435 | (2014.01) |
| B32B 27/08 | (2006.01) |
| B32B 37/06 | (2006.01) |
| B32B 38/00 | (2006.01) |
| B32B 27/00 | (2006.01) |

(52) U.S. Cl.
CPC ........... *B32B 38/0008* (2013.01); *B41M 3/14* (2013.01); *B41M 5/0047* (2013.01); *B41M 5/0064* (2013.01); *B41M 5/24* (2013.01); *B42D 25/29* (2014.10); *B42D 25/309* (2014.10); *B42D 25/378* (2014.10); *B42D 25/41* (2014.10); *B42D 25/435* (2014.10); *B42D 25/455* (2014.10); *B32B 2457/00* (2013.01)

(56) References Cited

U.S. PATENT DOCUMENTS

| | | | |
|---|---|---|---|
| 2,999,835 | A | 9/1961 | Goldberg et al. |
| 2,999,846 | A | 9/1961 | Schnell et al. |
| 3,028,365 | A | 4/1962 | Schnell et al. |
| 3,062,781 | A | 11/1962 | Bottenbruch et al. |
| 3,148,172 | A | 9/1964 | Fox et al. |
| 3,271,367 | A | 9/1966 | Schnell et al. |
| 3,275,601 | A | 9/1966 | Schnell et al. |
| 6,022,429 | A | 2/2000 | Hagstrom |
| 6,264,296 | B1 | 7/2001 | Klinefelter et al. |
| 6,685,312 | B2 | 2/2004 | Klinefelter et al. |
| 6,932,527 | B2 | 8/2005 | Pribula et al. |
| 6,979,141 | B2 | 12/2005 | Karts et al. |
| 7,037,013 | B2 | 5/2006 | Klinefelter et al. |
| 7,278,580 | B2 * | 10/2007 | Jones ............... G06K 19/02 235/487 |
| 2003/0183695 | A1 | 10/2003 | Labrec et al. |
| 2004/0011874 | A1 | 1/2004 | Theodossiou et al. |
| 2005/0001419 | A1 * | 1/2005 | Levy ............... B41M 5/24 281/2 |
| 2005/0095408 | A1 * | 5/2005 | LaBrec ............. B41M 3/14 428/195.1 |
| 2005/0247794 | A1 | 11/2005 | Jones et al. |

FOREIGN PATENT DOCUMENTS

| | | |
|---|---|---|
| DE | 2063052 | 7/1972 |
| DE | 2211956 | 10/1973 |
| DE | 2907004 | 8/1980 |
| DE | 3151407 | 10/1983 |
| DE | 4134539 | 4/1993 |
| DE | 19502206 | 8/1996 |
| EP | 0219011 | 4/1987 |
| EP | 1866845 B1 | 3/2013 |
| FR | 1561518 | 3/1969 |
| WO | 0227647 | 4/2002 |
| WO | 2004050767 | 12/2003 |
| WO | 2004/050766 | 6/2004 |
| WO | 2005058608 | 6/2005 |
| WO | 2005098746 | 10/2005 |
| WO | 2006042714 | 4/2006 |
| WO | 2006102700 | 10/2006 |

OTHER PUBLICATIONS

"Optical Document Security", Rudolf L. Van Renesse, Artech House, 2005, pp. 1-366.
"Dyes, General Survey", Booth et al., Ullmann's Encyclopedia of Industrial Chemistry, Wiley-VCH Verlag GmbH & Co., 2002, Article Online Posting Date: Jun. 15, 2000, pp. 1-61.
"Paints and Coatings", Stoye et al., Ullmann's Encyclopedia of Industrial Chemistry, Wiley-VCH Verlag GmbH & Co., 2006, Article Online Posting Date: Dec. 15, 2006, pp. 1-216.
"Imaging Technology", Winkelman et al., Ullmann's Encyclopedia of Industrial Chemistry, Wiley-VCH Verlag GmbH & Co., 2003, Article Online Posting Date: Mar. 15, 2003, pp. 1-116.
"Pigments, Organic", Hunger et al., Ullmann's Encyclopedia of Industrial Chemistry, Wiley-VCH Verlag GmbH & Co., 2002, Article Online Posting Date: Jun. 15, 2000, pp. 1-66.
"Pigments, Inorganic, 1. General", Hans G. Volz, Ullmann's Encyclopedia of Industrial Chemistry, Wiley-VCH Verlag GmbH & Co., 2009, Article Online Posting Date: Oct. 15, 2009, pp. 1-38.
"Pigments, Inorganic, 2. White Pigments", Auer et al., Ullmann's Encyclopedia of Industrial Chemistry, Wiley-VCH Verlag GmbH & Co., 2009, Article Online Posting Date: Oct. 15, 2009, pp. 1-40.
"Pigments, Inorganic, 3. Colored Pigments", Buxbaum et al., Ullmann's Encyclopedia of Industrial Chemistry, Wiley-VCH Verlag GmbH & Co., 2009, Article Online Posting Date: Oct. 15, 2009, pp. 1-49.
"Pigments, Inorganic, 4. Magnetic Pigments", Leitner et al., Ullmann's Encyclopedia of Industrial Chemistry, Wiley-VCH Verlag GmbH & Co., 2009, Article Online Posting Date: Oct. 15, 2009, pp. 1-8.
"Pigments, Inorganic, 5. Anticorrosive Pigments", Gunter Etzrodt, Ullmann's Encyclopedia of Industrial , chemistry, Wiley-VCH Verlag GmbH & Co., 2009, Article Online Posting Date: Oct. 15, 2009, pp. 1-22.
"Pigments, Inorganic, 6. Luster Pigments", Pfaff et al., Ullmann's Encyclopedia of Industrial Chemistry, Wiley-VCH Verlag GmbH & Co., 2009, Article Online Posting Date: Oct. 15, 2009, pp. 1-17.
"Pigments, Inorganic, 7. Transparent Pigments", Harald Gaedcke, Ullmann's Encyclopedia of Industrial Chemistry, Wiley-VCH Verlag GmbH & Co., 2009, Article Online Posting Date: Oct. 15, 2009, pp. 1-5.
U.S. Appl. No. 14/662,651, filed Mar. 19, 2015.
U.S. Appl. No. 13/799,430, filed Mar. 13, 2013.
U.S. Appl. No. 12/746,637, filed Aug. 4, 2010.

* cited by examiner

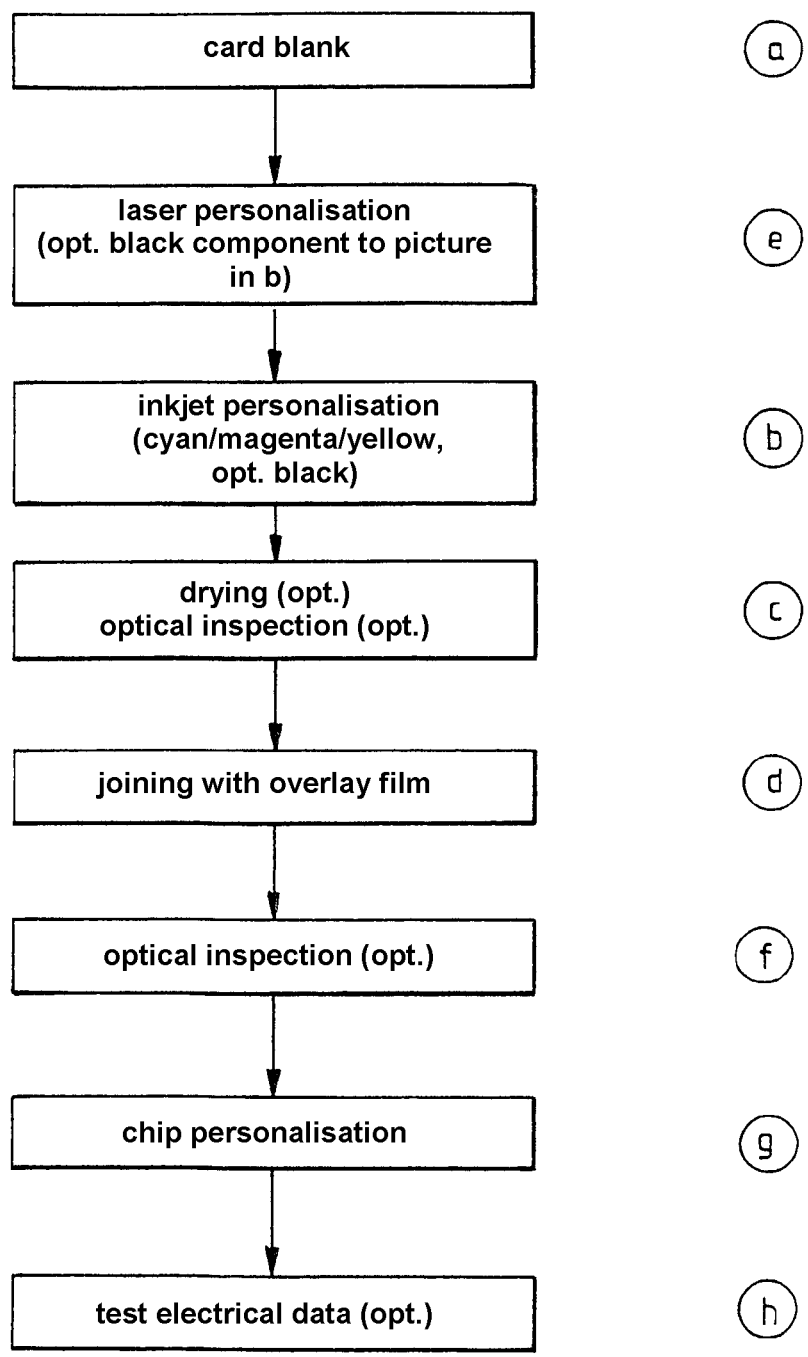

METHOD FOR PRODUCING A SECURITY AND/OR VALUABLE DOCUMENT WITH PERSONALIZED INFORMATION

CROSS REFERENCE TO RELATED APPLICATION

This application is a continuation of U.S. Ser. No. 14/662,651, filed Mar. 19, 2015, which is a continuation of U.S. Ser. No. 13/799,430, filed Mar. 13, 2013, which is a continuation-in-part of U.S. Ser. No. 12/746,637 filed Aug. 4, 2010 and entitled "METHOD FOR PRODUCING A SECURITY AND/OR VALUABLE DOCUMENT WITH PERSONALIZED INFORMATION", which is National Phase in the United States of PCT/DE2008/002014, filed Dec. 8, 2008, which claims priority to German Application No. 10 2007 059 746.2, filed Dec. 7, 2007, all of which are incorporated herein by reference.

FIELD OF THE INVENTION

The invention relates to a method for producing a security and/or valuable document having personalized information and containing a polymer layer composite or consisting thereof, said polymer layer composite being formed from a polymer layer partial composite and a polymer cover layer and the polymer layer partial composite and/or the polymer cover layer containing a laser sensitive component. The method consists of the followings steps: A) first personalized information is applied to the polymer layer partial composite by means of an inkjet printing method as a colored inkjet printed layer, and then B) the polymer cover layer is applied to the inkjet printed layer and is joined to the polymer layer partial composite. The invention also relates to a security and/or valuable document that can be produced according to such a method.

PRIOR ART AND BACKGROUND OF THE INVENTION

Personalization of a security and/or valuable document is a process, wherein personalized information, i.e. individual information for a certain person, which is intended as being about the holder or owner of the security and/or valuable document (for instance picture information, such as passport photograph, finger print etc; sequences of characters, such as name, address, place of residence etc.;) is applied on or in the respective security and/or valuable document. This may take place for instance in the form of colored or black and white imprints or laser engraving. Alternatively or additionally, this or other person-specific information may, however, also be stored in an electronic circuit integrated in the security and/or valuable document, and then the electronic circuit or the information contained therein can be read by authorized persons. Further, other electronic components can also be integrated in the document for storing and displaying information, e.g., a display module.

The personalization can be made in a centralized manner or in a decentralized manner. In the centralized personalization manner, the personalized information is determined and transmitted to a manufacturer of the security and/or valuable document. The latter then applies the personalized information in or on the security and/or valuable document during the production and completion thereof. In the decentralized personalization manner, the manufacturer of the security and/or valuable document supplies a non-personalized blank to one or several personalization locations away from the manufacturer, which carry out the determination of the personalized information and apply it on or in the blank thus completing the security and/or valuable document. If applicable, this process is complemented by the final application of an uppermost protective film. Furthermore, there is the possibility of a semi-decentralized personalization option, wherein the manufacturer supplies the non-personalized blanks to one or several personalization locations away from the manufacturer, which obtain the personalized information from collection locations away from the manufacturer and/or the personalization locations and issue the personalized security and/or valuable documents.

From the patent documents DE 2 907 004 C2, DE 3 151 407 C1 and EP 0 219 011 B1, different methods for laser marking of security and/or valuable documents are known in the art. By such methods, personalized information can be integrated in internal layers of a security and/or valuable document thus protecting it very well against manipulations. However, by means of this method, the integration of colored personalized information, such as, e.g., of fully colored passport photographs, is not possible.

From the documents U.S. Pat. No. 6,685,312, U.S. Pat. No. 6,932,527, U.S. Pat. No. 6,979,141, U.S. Pat. No. 7,037,013, U.S. Pat. No. 6,022,429 and U.S. Pat. No. 6,264,296, different methods for producing security and/or valuable documents are known in the art, wherein an inkjet printed layer is applied to a completed blank and then, if applicable, a protective paint is applied and the inkjet printed layer is protected against mechanical and/or chemical damages or manipulations. These methods are, therefore, basically suited for the decentralized personalization option. By these methods, colored personalized information can be applied to the security and/or valuable document, however, the resulting very superficial arrangement for this kind of joining does not provide a sufficient security against manipulations of the personalized information, since the protective film is not monolithically bound to the substrate.

TECHNICAL OBJECT OF THE INVENTION

It is the technical object of the invention to provide a method for producing a security and/or valuable document, wherein colored personalized information is protected with a high security against manipulations, and which can be carried out in a centralized manner, in a semi-decentralized manner or in a decentralized manner.

BASICS OF THE INVENTION AND PREFERRED EMBODIMENTS

For achieving this technical object, the invention teaches a method for producing a security and/or valuable document containing a polymer layer composite or consisting thereof, said polymer layer composite being formed from a polymer layer partial composite and a polymer cover layer and the polymer layer partial composite and/or the polymer cover layer containing a laser sensitive component or several laser sensitive components. The method consists of the following steps: A) first personalized information is applied to the polymer layer partial composite by means of an inkjet printing method as a colored inkjet printed layer, B) at least one polymer cover layer is applied to the inkjet printed layer and is joined to the polymer layer partial composite by thermal lamination, and C) second personalized information is inscribed into the polymer layer composite of the security and/or valuable document, obtained in step B), by means of laser engraving. Step C), inscription of the laser engraving, can alternatively also be done before steps A) and/or B). The advantage of this embodiment is that there cannot occur an interaction between the laser radiation and the inkjet printed layer. Further, an applied black personalization can be imprinted on the complete surface and, thus, be hidden invisibly. When the overprinting ink is IR-transparent, this hidden information can be read out by machine.

For this invention first personalized information is integrated in color in the security and/or valuable document and in a monolithic structure, which is formed by the thermal lamination of the polymer layer partial composite with the polymer cover layer. Thereby, a very high security against manipulation is obtained, since a manipulation by removing the polymer cover layer is practically impossible. By the thermal lamination the polymer layer partial composite and the polymer cover layer are basically materially joined with each other.

A polymer layer partial composite is also called a card or document blank. Normally, it is formed of a plurality of polymer layers, and at least one of the polymer layers, in most cases several polymer layers, may carry a printed layer. One of the polymer layers may also carry an electronic circuit (or integrated circuit, IC), a display module or another electronic circuit or contain this component in an embedded form. The polymer layers of the polymer layer partial composite are joined to each other for instance by gluing, or also by thermal lamination. The term polymer layer partial composite, however, also comprises monolithically produced card blanks, for instance as made by injection molding or transfer molding, reactively or non-reactively. A polymer layer partial composite does not necessarily need to be made from several polymer layers. This will, however, be the case for most security and/or valuable documents.

This thermal lamination can be carried out at temperatures between 140 and 270° C., preferably 140 and 210° C., and pressures (specific pressure directly at the workpiece) of 1 to 10 bars, in particular 3 to 7 bars.

After step B) (and before and/or after step C)), an optical inspection can be made in order to detect faults of the joining process by thermal lamination.

In principle, all polymer materials being common in the field of security and/or valuable documents can be used as materials for the polymer layer partial composite and the polymer cover layer. The polymer materials may be identical or different and may be based on a polymer material selected from the group consisting of PC (polycarbonate, in particular bisphenol A polycarbonate), PET (polyethylene glycol terephthalate), PMMA (polymethyl methacrylate), TPU (thermoplastic polyurethane elastomers), PE (polyethylene), PP (polypropylene), PI (polyimide or poly-trans-isoprene), PVC (polyvinyl chloride) and copolymers of such polymers. Preferred is the use of PC materials, and, for instance for the polymer cover layer in particular, so-called low-$T_g$ materials can be used.

Low-$T_g$ materials are polymers, the glass temperature of which is below 140° C. It is preferred that the polymer layer partial composite and the polymer cover layer are formed from identical or different polymers, and at least the basic polymer of the polymer cover layer, preferably also the basic polymer of the polymer layer partial composite, contains identical or different groups that are reactive with each other; at a lamination temperature of less than 200° C. reactive groups of the polymer cover layer react with each other and/or with reactive groups of the polymer layer partial composite and undergo a covalent binding with each other. Thereby the lamination temperature can be reduced without the tight bond of the laminated layers being at risk. This is caused by that (for reactive groups in the polymer layer partial composite as well as in the polymer cover layer) because of the reaction of the respective reactive groups the different polymer layers cannot easily be delaminated anymore. There is a reactive coupling between the layers, so to speak a reactive lamination. Secondly, it is made possible because the lower lamination temperature with a change of the colored inkjet printed layer, in particular a color change, is prevented. It is preferred that the glass temperature $T_g$ of the polymer cover layer before the thermal lamination is less than 120° C. (or even less than 110° C. or less than 100° C.), and that the glass temperature of this polymer layer after the thermal lamination by reaction of reactive groups of the basic polymer of the polymer layer with each other is at least 5° C. and preferably at least 20° C. higher than the glass temperature before the thermal lamination. Herein, not only a reactive coupling of the layers to be laminated with each other, but rather an increase of the molecular weight and thus of the glass temperature by cross-linkage of the polymer within the layer and between the layers takes place. This additionally makes a delamination difficult. Preferably the lamination temperature in step B) when using such polymer materials is less than 180° C., and even better is less than 150° C. The choice of suitable reactive groups is easy for the man skilled in the art of polymeric chemistry. Exemplary reactive groups are selected from the group consisting of —CN, —OCN, —NCO, —NC, —SH, —S$_x$, -Tos, —SCN, —NCS, —H, epoxy (—CHOCH$_2$), —NH$_2$, —NN$^+$, —NN—R, —OH, —COOH, —CHO, —COOR, -Hal (—F, —Cl, —Br, —I), -Me-Hal (Me=at least divalent metal, for instance Mg), —Si(OR)$_3$, —SiHal$_3$, —CH=CH$_2$, and —COR, wherein R may be an arbitrary reactive or non-reactive group, for instance —H, -Hal, C$_1$-C$_{20}$ alkyl, C$_3$-C$_{20}$ aryl, C$_4$-C$_{20}$ aralkyl, each branched or linear, saturated or unsaturated, optionally substituted, or corresponding heterocycles with one or several identical or different heteroatoms N, O, or S. Other reactive groups are of course also possible. Thereto belong the reaction partners of a Diels-Alder reaction or of a metathesis. The reactive groups may be bound directly to the basic polymer or be connected by a spacer group to the basic polymer. Spacer groups may be all spacer groups known to the man skilled in the art of polymeric chemistry. The spacer groups may also be oligomers or polymers, which mediate elasticity, thus reducing the risk of breaking of the security and/or valuable document. The man skilled in the art is familiar with such elasticity-mediating spacer groups, which, therefore, do not need to be described here in more detail. Examples of spacer groups are selected from the group consisting of —(CH$_2$)$_n$—, —(CH$_2$—CH$_2$—O)$_n$—, —(SiR$_2$—O)$_n$—, —(C$_6$H$_4$)$_n$—, —(C$_6$H$_{10}$)$_n$, C$_1$-C$_n$ alkyl, C$_3$-C$_{(n+3)}$ aryl, C$_4$-C$_{(n+4)}$ aralkyl, each branched or linear, saturated or unsaturated, optionally substituted, or corresponding heterocycles with one or several, identical or different heteroatoms O, N, or S, with n=1 to 20, preferably 1 to 10. With respect to further reactive groups or possibilities of modification, reference is made to the document "Ullmann's Encyclopaedia of Industrial Chemistry", Wiley Verlag, electronic edition 2007. The term basic polymer denotes for the purpose of the above explanations a polymeric structure, which does not carry any reactive groups under the employed lamination conditions. They may be homopolymers or copolymers. However, polymers being modified with respect to the mentioned polymers are also comprised.

For the purpose of the invention, it is also possible that the side of the polymer layer partial composite directed toward the polymer cover layer may be chemically modified before or after overprinting the inkjet printed layer such that on the surface the above mentioned reactive groups are bound.

In an improvement of the invention, the polymer layer partial composite contains an electronic circuit or an electronic circuitry (laminated or embedded), and third personalized information is stored before, in particular immediately before, at the same time or after step C) in the electronic circuit. It is useful if the polymer layer partial composite has on the side of the electronic circuit and/or on the side opposite to the electronic circuit, at least in the area of the electronic circuit, a preferably opaque overprint. Thereby, the electronic circuit can be protected against light irradiation or a converter layer according to document EP 1 866 845 can be integrated with the invention.

The laser sensitive component may be provided in the polymer layer partial composite and/or in the polymer cover layer. It is preferred that only the polymer layer composite contains a laser sensitive layer. Thereby an attempt of manipulation is made difficult, since the personalized information produced by means of laser engraving remains deeply embedded in the polymer layer composite, even when the polymer cover layer and the inkjet printed layer are removed.

The inscription of plastics films by means of laser engraving is referred to among experts and also herein as laser inscription for short. Accordingly, the expression "laser-inscribed" hereinbelow is to be understood as meaning inscribed by means of laser engraving. The process of laser engraving is known to the person skilled in the art and is not to be confused with printing by means of laser printing.

Suitable laser-sensitive additives are, for example, so-called laser marking additives, that is to say additives comprising an absorber in the wavelength range of the laser to be used, preferably in the wavelength range of ND:YAG lasers (neodymium-doped yttrium-aluminium-garnet lasers). Such laser marking additives and their use in moulding compositions are described, for example, in WO-A 2004/50766 and WO-A 2004/50767 and are sold commercially by DSM under the trade name Micabs®. Further absorbers suitable as laser-sensitive additives are carbon black, and phosphorus-containing tin/copper mixed oxides as described, for example, in WO-A 2006/042714.

Preference is given to laser-sensitive additives for inscription by laser engraving of dark on a light background. Particularly preferred laser-sensitive additives within the scope of the invention are black pigments. A most particularly preferred laser-sensitive additive is carbon black.

It is preferable for the particle size of the laser-sensitive additive to be in the range from 100 nm to 10 µm, and particularly advantageous for it to be in the range from 50 nm to 2 µm.

In step A), to one or both sides of the polymer layer partial composite, a personalized colored inkjet printed layer can be applied. Then the colored inkjet printed layers on different sides may, but not necessarily, represent partial information of the first personalized information and, optionally, be arranged complementarily to each other and exactly to register. In other words, the different inkjet printed layers represent partial pictures of an overall picture.

In another embodiment, personalized colored inkjet printed layers are applied in step A) to both sides of the polymer layer partial composite. Herein the card body of the polymer layer partial composite is, however, not transparent, so that both printed layers contain independent personalization information.

In a particularly preferred variant of the invention, the first personalized information is the color portion of a personalized overall picture information, and the second personalized information is the black portion of the personalized overall picture information. Herein, the overall picture information is only produced by the inkjet printed layer as well as the laser engraving process, and the inkjet printed layer represents a first partial picture and the laser engraving represents a second partial picture of the overall picture information. It is understood that the partial pictures have to be produced or applied exactly to register with respect to each other. Particularly preferred in this case is that first the black portion is integrated (step C), since an exactly fitting orientation of the inkjet print (step A) can be achieved in a technically easier way. Then the lamination is carried out (step B).

Optionally, an optical inspection of the colored inkjet printed layer and/or an electronic test of the electronic circuit, in particular of the electronic circuitry or display module, can be made before or after step B) or C).

The polymer layer partial composite may additionally be provided internally or on one or both sides with a printed layer, which has been applied by a non-inkjet printing technology. Thereto belong the classic printing methods such as relief printing (direct and indirect), lithographic printing in the versions offset printing, wet and waterless printing, screen printing (silkscreen), digital and, in particular, intaglio and photogravure.

The invention further relates to a security and/or valuable document containing a polymer layer partial composite and a polymer cover layer, or consisting thereof, between the polymer layer partial composite and the polymer cover layer a colored inkjet printed layer produced by means of inkjet printing with a first personalized information, and, in the polymer layer partial composite and/or the polymer cover layer containing a laser sensitive component, a second personalized information produced by means of laser engraving. The explanations with regard to the method described above apply in an analogous manner.

Typically, the first personalized information or the personalized overall picture information will be a picture representation, in particular a passport photograph of a person.

The second personalized information may contain a personalized sequence of characters or consist thereof. This may for instance be the name of the person, the date of birth, and/or the address etc. The second personalized information may, however, also comprise document-specific information, as for instance serial number or date of issue, or consist thereof.

The polymer layer partial composite may have a thickness in the range from 200 to 2,000 µm, in particular from 400 to 1,500 µm. The polymer cover layer may have a thickness in the range from 5 to 270 µm, preferably from 10 to 120 µm, and, most preferably, 20 to 120 µm.

For producing the inkjet printed layer, in principle all conventional inks can be used. Preferred is the use of a preparation containing: A) 0.1 to 20 wt. % of a binding agent with a polycarbonate derivative based on a geminally disubstituted dihydroxydiphenyl cycloalkane, B) 30 to 99.9 wt. % of a preferably organic solvent or solvent mixture, C) 0 to 10 wt. %, referred to dry matter, of a colorant or colorant mixture, D) 0 to 10 wt. % of a functional material or of a mixture of functional materials, E) 0 to 30 wt. % of an additive and/or auxiliary substances, or of a mixture of such substances, the sum of the components A) to E) always being 100 wt. %, as an inkjet printing ink. Such polycarbonate derivatives are highly compatible with polycarbonate materials, in particular with polycarbonates based on bisphenol A, such as for instance Makrofol® films. Furthermore, the employed polycarbonate derivative has high-temperature stability and does not show any colorations at temperatures being typical for lamination, up to 200° C. and more, thereby the use of the low-$T_g$ materials described above not being necessary. In particular, the polycarbonate derivative may contain functional carbonate structural units of Formula (I),

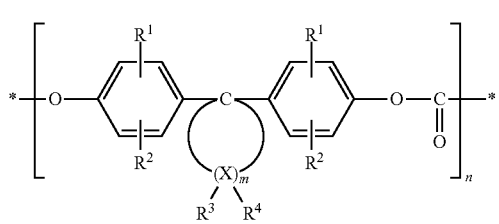

wherein $R^1$ and $R^2$ are independent from each other and are selected from hydrogen, halogen (preferably chlorine or bromine), $C_1$-$C_8$ alkyl, $C_5$-$C_6$ cycloalkyl, $C_6$-$C_{10}$ aryl (preferably phenyl) and $C_7$-$C_{12}$ aralkyl (preferably phenyl-$C_1$-$C_4$ alkyl, in particular benzyl); m is an integer from 4 to 7 (preferably 4 or 5); $R^3$ and $R^4$ are individually selected for each X, and independently from each other are selected to be hydrogen or $C_1$-$C_6$ alkyl; X is carbon and n is an integer greater than 20, such that for at least one atom for an X, $R^3$ and $R^4$ are each alkyl. It is preferred that at 1 to 2 atoms for X, in particular only at one atom X, $R^3$ and $R^4$ are each alkyl. $R^3$ and $R^4$ may in particular each be methyl. The X atoms in alpha position with respect to the diphenyl-substituted C atom (C1) may not be dialkyl-substituted. The X atoms in beta position with respect to C1 may be disubstituted with alkyl. Preferred is m=4 or 5. The polycarbonate derivative may for instance be based on monomers, such as 4,4'-(3,3,5-trimethylcyclohexane-1,1-diyl)diphenol, 4,4'-(3,3-dimethylcyclohexane-1,1-diyl) diphenol, or 4,4'-(2,4,4-trimethylcyclopentane-1,1-diyl)diphenol. Such a polycarbonate derivative may for instance be produced from diphenols of the Formula (Ia) according to document DE 38 32 396.6, whose scope of disclosure is herewith explicitly integrated with its complete contents in the scope of disclosure of this description. A diphenol of the Formula (Ia), under formation of homopolycarbonates, as well as several diphenols of the Formula (Ia), under formation of copolycarbonates, can be used (the meaning of the radicals, groups and parameters being the same as in Formula I).

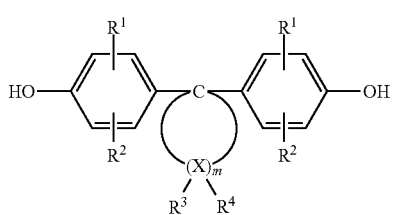

Furthermore, the diphenols of the Formula (Ia) can also be used in a mixture with other diphenols, for instance with those of the Formula (Ib)

for producing high-molecular, thermoplastic, aromatic polycarbonate derivatives.

Suitable other diphenols of the Formula (Ib) are those, in which Z is an aromatic radical with 6 to 30 C atoms, which may comprise one or several aromatic nuclei, which may be substituted and which may contain aliphatic radicals or other cycloaliphatic radicals than those of the Formula (Ia) or heteroatoms as bridge members. Examples for the diphenols of the Formula (Ib) are: hydroquinone, resorcin, dihydroxydiphenyls, bi-(hydroxyphenyl)-alkanes, bis-(hydroxyphenyl)-cycloalkanes, bis-(hydroxyphenyl)-sulphides, bis-(hydroxyphenyl)-ethers, bis-(hydroxyphenyl)-ketones, bis-(hydroxyphenyl)-sulphones, bis-(hydroxyphenyl)-sulphoxides, alpha,alpha'-bis-(hydroxyphenyl)-diisopropylbenzenes and the nucleus-alkylated and nucleus-halogenated compounds thereof. These and other suitable diphenols are e.g. described in the documents U.S. Pat. Nos. 3,028,365; 2,999,835; 3,148,172; 3,275,601; 2,991,273; 3,271,367; 3,062,781; 2,970,131; and 2,999,846; in the documents DE-A 1 570 703, 2 063 050, 2 063 052, 2 211 956, Fr-A 1 561 518; and in the monograph H. Schnell, Chemistry and Physics of Polycarbonates, Interscience Publishers, New York 1964", which herewith are explicitly integrated with their complete contents in the scope of disclosure of this application. Preferred other diphenols are for instance: 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, alpha, alpha-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulphone, 2,4-bis-(3,5-dimethyl-4-hydroxyphenyl)-2-methylbutane, 1,1-bis-(3,5-dimethyl-4-hydroxyphenyl)-cyclohexane, alpha,alpha-bis-(3,5-dimethyl-4-hydroxyphenyl)-p-diisopropylbenzene, 2,2-bis-(3,5-dichloro-4-hydroxyphenyl)-propane and 2,2-bis-(3,5-dibromo-4-hydroxyphenyl)-propane. Particularly preferred diphenols of the Formula (Ib) are, for instance: 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-cyclohexane. In particular, 2,2-bis-(4-hydroxyphenyl)-propane is preferred. The other diphenols may be used individually as well as in a mixture. The molar ratio of diphenols of the Formula (Ia) to the other diphenols of the Formula (Ib) also to be used, if applicable, should be from 100 mol % (Ia) to 0 mol % (Ib) and 2 mol % (Ia) to 98 mol % (Ib), preferably from 100 mol % (Ia) to 0 mol % (Ib) and 10 mol % (Ia) to 90 mol % (Ib) and, in particular, from 100 mol % (Ia) to 0 mol % (Ib) and 30 mol % (Ia) to 70 mol % (Ib). The high-molecular polycarbonate derivatives from the diphenols of the Formula (Ia), if applicable, in a combination with other diphenols, may be produced according to the known polycarbonate production method. The different diphenols may be linked to each other statistically as well as block-wise. The employed polycarbonate derivatives may be branched in a per se known manner. If a branching is desired, this can be achieved in a known manner by condensation of small amounts, preferably amounts between 0.05 and 2.0 mol % (referred to employed diphenols), at three- or more than three-functional compounds, in particular those with three or more than three phenolic hydroxyl groups. Some branching agents with three or more than three phenolic hydroxyl groups are: phloroglucin, 4,6-dimethyl-2,4,6-tri-(4-hydroxyphenyl)-heptene-2,4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenyl-isopropyl)-phenol, 2,6-is-(2-hydroxy-5-methyl-benzyl)-4-methylphenol, 2-(4-hydroxyphenyl)-2-(2,4-dihydroxyphenyl)-propane, hexa-[4-(4-hydroxyphenyl-isopropyl)-phenyl]-ortho-terephthalic acid ester, tetra-(4-hydroxyphenyl)-methane, tetra-[4-(4-hydroxyphenyl-isopropyl) phenoxy]-methane and 1,4-bis-[4',4"-dihydroxytriphenyl)-methyl]-benzene. Some of the other three-functional compounds are 2,4-dihydroxybenzoic acid, trimesic acid, cyanuric chloride and 3,3-bis-(3-methyl-4-hydroxyphenyl)-2-oxo-2,3-dihydroindole. Chain terminators for the per se known control of the molecular weight of the polycarbonate derivatives serve mono-functional compounds in usual concentrations. Suitable compounds are, e.g., phenol, tert-butylphenols or other alkyl-substituted phenols. For controlling the molecular weight, in particular, small amounts of phenols of the Formula (Ic) are suitable

(Ic)

wherein R is a branched $C_8$ and/or $C_9$ alkyl radical. It is preferred is that in the alkyl radical R the portion of $CH_3$ protons is between 47 and 89% and the portion of the CH and $CH_2$ protons is between 53 and 11%; also preferred is R in an o and/or p position with respect to the OH group; and particularly preferred is an upper limit of the ortho portion of 20%. The chain terminators are, in general, preferred to be in amounts of 0.5 to 10, preferably 1.5 to 8 mol %, in reference to the employed diphenols. The polycarbonate derivatives may preferably be produced in a per se known manner according to the phase boundary behaviour (comp. H. Schnell "Chemistry and Physics of Polycarbonates", Polymer Reviews, Vol. IX, page 33ff., Interscience Publ. 1964). Herein, the diphenols of the Formula (Ia) are dissolved in an aqueous alkaline phase. For producing copolycarbonates with other diphenols, mixtures of diphenols of the Formula (Ia) and the other diphenols, for instance those of the Formula (Ib), are employed. For controlling the molecular weight, chain terminators e.g. of the Formula (Ic) may be added. Then, in the presence of an inert, preferably polycarbonate-dissolving organic phase, a reaction with phosgene according to the method of the phase boundary condensation is carried out. The reaction temperature is between 0° C. and 40° C. The branching agents which are also used if applicable (preferably 0.05 to 2.0 mol %) may either be provided with the diphenols in the aqueous alkaline phase or added in a solution with the organic solvent before the phosgenation. Besides the diphenols of the Formula (Ia) and, if applicable, other diphenols (Ib), the mono- and/or bis-chlorocarbonic acid esters thereof can also be used, which are added in a solution with organic solvents. The amount of chain terminators and of any branching agents depends on the molar amount of diphenolate radicals according to Formula (Ia) and, if applicable, Formula (Ib); when also using chlorocarbonic acid esters, the amount of phosgene can be reduced in a known manner. Suitable organic solvents for the chain terminators and, if applicable, for the branching agents and the chlorocarbonic acid esters are for instance methylene chloride, chlorobenzene and, in particular, mixtures of methylene chloride and chloroben-zene. If applicable, the employed chain terminators and branching agents can be dissolved in the same solvent. As an organic phase for the phase boundary polycondensation for instance, methylene chloride, chlorobenzene and mixtures of methylene chloride and chlorobenzene may be used. As an aqueous alkaline phase for instance NaOH solution may be used. The production of the polycarbonate derivatives according to the phase boundary method can be catalyzed in a conventional way by catalysts such as tertiary amines, in particular tertiary aliphatic amines such as tributylamine or triethylamine. The catalysts can be used in amounts from 0.05 to 10 mol %, in reference to the moles of employed diphenols. The catalysts can be added before starting the phosgenation or during or also after the phosgenation. The polycarbonate derivatives can be produced according to the known method in a homogeneous phase, the so-called "pyridine method" and according to the known melt transesterification method by using, for instance, diphenylcarbonate instead of phosgene. The polycarbonate derivatives may be linear or branched, and they are homopolycarbonates or copolycarbonates based on the diphenols of the Formula (Ia). By the arbitrary composition with other diphenols, in particular with those of the Formula (Ib), the polycarbonate properties can be varied in a favorable way. In such copolycarbonates, the diphenols of the Formula (Ia) are contained in amounts from 100 mol % to 2 mol %, preferably in amounts from 100 mol % to 10 mol % and, in particular, in amounts from 100 mol % to 30 mol %, in reference to the total amount of 100 mol % of diphenol units in the polycarbonate derivatives. The polycarbonate derivative may be a copolymer containing, in particular consisting thereof, monomer units M1 based on the Formula (Ib), preferably bisphenol A, and monomer units M2 based on the geminally disubstituted dihydroxydiphenyl cycloalkanes, preferably of the 4,4'-(3,3,5-trimethylcyclohexane-1,1-diyl)diphenol, the molar ratio M2/M1 preferably being greater than 0.3, in particular greater than 0.4, for instance greater than 0.5. It is preferred that the polycarbonate derivative has a mean molecular weight (weight average) of at least 10,000, preferably of 20,000 to 300,000. The component B may in principle be essentially organic or aqueous. Essentially aqueous means that up to 20 wt. % of the component B) may be organic solvents. Essentially organic means that up to 5 wt. % water may be present in the component B). Preferably, component B contains or consists of a liquid aliphatic, cycloaliphatic, and/or aromatic hydrocarbon, a liquid organic ester, and/or a mixture of such substances. The employed organic solvents are preferably halogen-free organic solvents. These may be, in particular, aliphatic, cycloaliphatic, aromatic hydrocarbons, such as mesitylene, 1,2,4-trimethylbenzene, cumene and solvent naphtha, toluene, xylene; (organic) esters, such as methyl acetate, ethyl acetate, butyl acetate, methoxypropyl acetate, ethyl-3-ethoxypropionate. Preferred are mesitylene, 1,2,4-trimethylbenzene, cumene and solvent naphtha, toluene, xylene, acetic acid methyl ester, acetic acid ethyl ester, methoxypropyl acetate, ethyl-3-ethoxy propionate. Particularly preferred are: mesitylene (1,3,5-trimethylbenzene), 1,2,4-trimethylbenzene, cumene (2-phenylpropane), solvent naphtha and ethyl-3-ethoxy propionate. A suitable solvent mixture comprises for instance L1) 0 to 10 wt. %, preferably 1 to 5 wt. %, in particular 2 to 3 wt. %, mesitylene, L2) 10 to 50 wt. %, preferably 25 to 50 wt. %, in particular 30 to 40 wt. %, 1-methoxy-2-propyl acetate, L3) 0 to 20 wt. %, preferably 1 to 20 wt. %, in particular 7 to 15 wt. %, 1,2,4-trimethylbenzene, L4) 10 to 50 wt. %, preferably 25 to 50 wt. %, in particular 30 to 40 wt. %, ethyl-3-ethoxy propionate, L5) 0 to 10 wt. %, preferably 0.01 to 2 wt. %, in particular 0.05 to 0.5 wt. %, cumene, and L6) 0 to 80 wt. %, preferably 1 to 40 wt. %, in particular 15 to 25 wt. %, solvent naphtha, the sum of the components L1) to L6) always being 100 wt. %. The polycarbonate derivative typically has a mean molecular weight (weight average) of at least 10,000, preferably from 20,000 to 300,000. The preparation may in particular comprise: A) 0.1 to 10 wt. %, in particular 0.5 to 5 wt. %, of a binding agent with a polycarbonate derivative based on a geminally disubstituted dihydroxydiphenyl cycloalkane, B) 40 to 99.9 wt. %, in particular 45 to 99.5 wt. %, of an organic solvent or solvent mixture, C) 0.1 to 6 wt. %, in particular 0.5 to 4 wt. %, of a colorant or colorant mixture, D) 0.001 to 6 wt. %, in particular 0.1 to 4 wt. %, of a functional material or of a mixture of functional materials, E) 0.1 to 30 wt. %, in particular 1 to 20 wt. %, additive and/or auxiliary substances, or of a mixture of such substances. As component C, if a colorant is to be provided, in principle any arbitrary colorant or colorant mixture can be used. Colorants can be selected from all color-changing substances. This means these may be dyes (a survey of dyes is found in Ullmann's Encyclopaedia of Industrial Chemistry, Electronic Release 2007, Wiley Verlag, chapter "Dyes, General Survey)", as well as pigments (a survey of organic and inorganic pigments is found in Ullmann's Encyclopaedia of Industrial Chemistry, Electronic Release 2007, Wiley Verlag, chapter "Pigments, Organic" or "Pigments, Inorganic"). Dyes should be soluble or (stably) dispersible or suspensible in the solvents of the component B. Furthermore, it is advantageous if the colorant is stable, in particular, color-stable, at temperatures of 160° C. and greater for a time of more than 5 min. It is also possible that the colorant may be subjected to a given and reproducible color change under the processing conditions and is selected correspondingly. Pigments must have, besides the temperature stability, in particular a very fine particle size distribution. In the practice of inkjet printing, this means that the particle size should not be higher than 1.0 µm, since otherwise blockings in the pressure head will occur. Usually nano-scale solid pigments and soluble organic colorants have shown good results. The colorants may be cationic, anionic or neutral. Examples of colorants that can be used for inkjet printing are: Brillantschwarz C.I. No. 28440, Chromogenschwarz C.I. No. 14645, Direkttiefschwarz E C.I. No. 30235, Echtschwarzsalz B C.I. No. 37245, Echtschwarzsalz K C.I. No. 37190, Sudanschwarz HB C.I. 26150, Naphtolschwarz C.I. No. 20470, Bayscript® Schwarz Flüssig, C.I. Basic Black 11, C.I. Basic Blue 154, Cartasol® Türkis K-ZL Flüssig, Cartasol® Türkis K-RL Flüssig (C.I. Basic Blue 140), Cartasol Blau K5R Flüssig. Also suitable are, e.g., the commercially obtainable colorants Hostafine® Schwarz TS Flüssig (sold by Clariant GmbH Germany), Bayscript® Schwarz Flüssig (C.I. mixture, sold by Bayer AG Germany), Cartasol® Schwarz MG Flüssig (C.I. Basic Black 11, registered trademark of Clariant GmbH Germany), Flexonylschwarz® PR 100 (E C.I. No. 30235, sold by Hoechst AG), Rhodamin B, Cartasol® Orange K3 GL, Cartasol® Gelb K4 GL, Cartasol® K GL, or Cartasol® Rot K-3B. Further, soluble colorants such as anthraquinone, azo, quinophthalone, cumarin, methin, perinone, and/or pyrazole colorants, e.g. obtainable under the trade name Macrolex® can be used. Further suitable colorants are described in the document Ullmann's Encyclopaedia of Industrial Chemistry, Electronic Release 2007, Wiley Verlag, chapter "Colorants Used in Ink Jet Inks". Well soluble colorants will lead to an optimum integration in the matrix or the binding agent of the printing layer. The colorants can be added either directly as a dye or pigment or as a paste, a mixture of dye and pigment together with an additional binding agent. This additional binding agent should be chemically compatible with the additional components of the preparation. If such a paste is used as a colorant, the amount of the component B refers to the colorant without the other components of the paste. These other components of the paste must then be subsumed under the component E. When using so-called colored pigments in the scale colours cyan-magenta-yellow and preferably also (soot-) black, full-tone color images are possible. The component D comprises substances, which by using technical means can immediately be seen by the human eye or by using suitable detectors. These are materials familiar to the man skilled in the art (cf. also van Renesse, *Optical Document Security,* 3rd ed., Artech House, 2005), and are used for the protection of valuable and security documents. Thereto belong luminescent substances (dyes or pigments, organic or inorganic) such as, e.g., photoluminophores, electroluminophores, anti-Stokes luminophores, fluorophores, but also magnetizable, photo-acoustically addressable or piezoelectric materials. Furthermore, Raman-active or Raman-amplifying materials can be used, the same as so-called barcode materials. Here too the preferred criteria are either solubility in the component B or, for pigmented systems, particle sizes<1 µm and temperature stability at temperatures>160° C. as explained with regard to component C. Functional materials can be added directly or via a paste, i.e., mixture, with an additional binding agent, which is then a constituent of component E, or the employed binding agent of component A. Component E comprises the substances normally used for inks in ink jet printing, such as anti-foaming agents, set-up agents, wetting agents, tensides, floating agents, drying agents, catalysts, light stabilizers, preservation agents, biocides, organic polymers for viscosity adjustment, buffer systems, etc. Set-up agents are for instance conventional set-up salts such as sodium lactate. As biocides all commercially available preservation agents which are used for inks may be used. Examples are Proxel® GXL and Parmetol® A26. All commercially available tensides which are used for inks may be used. Preferred are amphoteric or non-ionic tensides. Of course, however, the use of special anionic or cationic tensides, which do not alter the properties of the dye, is also possible. Examples for suitable tensides are betaines, ethoxilated diols etc. Examples are the product series Surfynol® and Tergitol®. The amount of tensides is, for instance, selected such that the surface tension of the ink is in the range from 10 to 60 mN/m, preferably from 20 to 45 mN/m, measured at 25° C. A buffer system may be provided, which stabilizes the pH value in the range from 2.5 to 8.5, in particular in the range from 5 to 8. Suitable buffer systems are lithium acetate, borate buffer, triethanolamine or acetic acid/sodium acetate. A buffer system will, in particular, be applied in the case of a substantially aqueous component B. For adjusting the viscosity of the ink, if applicable, water-soluble polymers may be provided. These may be selected from all polymers that are suitable for conventional ink formulations. Examples are water-soluble starch, in particular with an average molecular weight from 3,000 to 7,000; polyvinylpyrolidone, in particular with an average molecular weight from 25,000 to 250,000; polyvinyl alcohol, in particular with an average molecular weight from 10,000 to 20,000; xanthan gum, carboxymethyl cellulose, and ethylene oxide/propylene oxide block copolymer, in particular with an average molecular weight from 1,000 to 8,000. An example for the above block copolymer is the product series Pluronic®. The share of biocide, in reference to the total amount of ink, may be in the range from 0 to 0.5 wt. %, preferably from 0.1 to 0.3 wt. %. The share of tenside, in reference to the total amount of ink, may be in the range of from 0 to 0.2 wt. %. The share of set-up agents, in reference to the total amount of ink, may be from 0 to 1 wt. %, preferably from 0.1 to 0.5 wt. %. To the auxiliary agents also belong all other components such as, for instance, acetic acid, formic acid or n-methyl pyrolidone or other polymers from the used dye solution or paste. With regard to substances, which are suitable as component E, reference is made, for instance, to *Ullmann's Encyclopaedia of Chemical Industry*, Electronic Release 2007, Wiley Verlag, chapter "Paints and Coatings", section "Paint Additives".

The laser sensitive component may in principle be a polymer, which can be locally pyrolyzed by laser irradiation and, thus, dyed black. The respective polymer layer may also consist of such a polymer. Suitable polymers are explained in the following text in connection with laser sensitive pigments. The laser sensitive component may, however, also be a laser sensitive pigment, which is mixed with the polymer material of the respective polymer layer and is distributed therein. As laser sensitive pigments, all pigments that are known in the technological field of the security and/or valuable products can be used. They may, for instance, be formed from organic polymers, which have a high absorption of the laser radiation, for instance PET, ABS, polystyrene, PPO, polyphenylene sulphide, polyphenylene sulphone, polyimide sulphone. They may, however, also be, for instance, LCP's. Particularly suitable are micromilled thermoplastic materials with a very high melting range of greater than 300° C. The particle size is typically in the range of from 0.01 to 100 in particular 0.1 to 50 µm, and preferably 1 to 20 µm. Further, the polymer particles may contain light sensitive filler materials or pigments, for instance in an amount of 0.1 to 90 wt. %, in reference to the laser sensitive pigment. They may also be electrically conductive pigments and/or affect pigments and/or dyes, as described above. They may, however, also be oxides, hydroxides, sulphides, sulphates or phosphates of metals, such as for instance Cu, Bi, Sn, Zn, Ag, Sb, Mn, Fe, Ni, or Cr. In particular basic Cu(II)hydroxide phosphate can be employed. For example, a product is mentioned that is formed by heating blue Cu(II)orthophosphate ($Cu_3(PO_4)_2*3H_2O$) to 100 to 200° C. and which has the chemical formula $Cu_3(PO_4)_2*Cu(OH)_2$. Further suitable copper phosphates are: $Cu_3(PO_4)_2*3Cu(OH)_2$, $Cu_3(PO_4)_2*2Cu(OH)_2*2H_2O$, $4CuO*P_2O_5$, $4CuO*P_2O_5*3H_2O$, $4CuO*P_2O_5*1.5H_2O$ and $4CuO*P_2O_5*1.2H_2O$.

Suitable laser radiation for generating the second personalized information has a wave length in the range from 150 nm to 10,600 nm, in particular 150 nm to 1,100 nm. For instance $CO_2$ lasers (10,600 nm), Nd:YAG lasers (1,064 nm or 532 nm), and pulsed UV lasers (excimer lasers) can be used. The energy density is in general in the range of from 0.3 $mJ/cm^2$ to 50 $J/cm^2$, in particular in the range of from 0.3 $mJ/cm^2$ to 10 $J/cm^2$.

Further printed layers may be provided on the polylayer partial composite or integrated therein, said further printed layers being known from the field of security and/or valuable documents. They may be arranged on one side or on both sides of the polymer layer partial composite before the thermal lamination. Such other printed layer may also be applied on the colored inkjet printed layer, immediately above or below the inkjet printed layer and/or on the side of the polymer layer partial composite being opposite to the inkjet printed layer. Such printed layers may also comprise functional substances, as explained above with respect to component D).

A security and/or valuable document according to the invention may additionally contain a layer or several layers based on paper, Teslin® substrate and other composite materials. These may be integrated in the polymer layer partial composite or connected therewith in a stacked manner.

Examples for security and/or valuable documents are: identity cards, passports, ID cards, access control cards, visas, tickets, driver's licenses, vehicle documents, personalized valuable documents, credit cards, and personalized chip cards. Such security and/or valuable documents typically comprise at least a substrate, a printed layer and optionally a transparent cover layer. The substrate and cover layers themselves may be composed of a multitude of layers. A substrate is a carrier structure to which the printed layer with information, images, patterns and the like is applied. As materials for a substrate, all conventional materials having a paper and/or -organicpolymer basis can be used. Such a security and/or valuable document comprises within the total multi-layer structure a polymer layer composite of a polymer layer partial composite and a polymer cover layer according to the invention. Besides the polymer layer composite according to the invention, at least one-additional printed layer may be provided, which may be applied on an external surface of the polymer layer composite or on an additional layer connected with the polymer layer composite.

BRIEF DESCRIPTION OF THE DRAWINGS

In the following, the invention is explained in more detail with reference to embodiments representing examples only. There are:

FIG. 5: process sequence of a third variant of the method according to the invention.

EXAMPLE 1: FIRST PRODUCTION PROCESS

Figure 1:
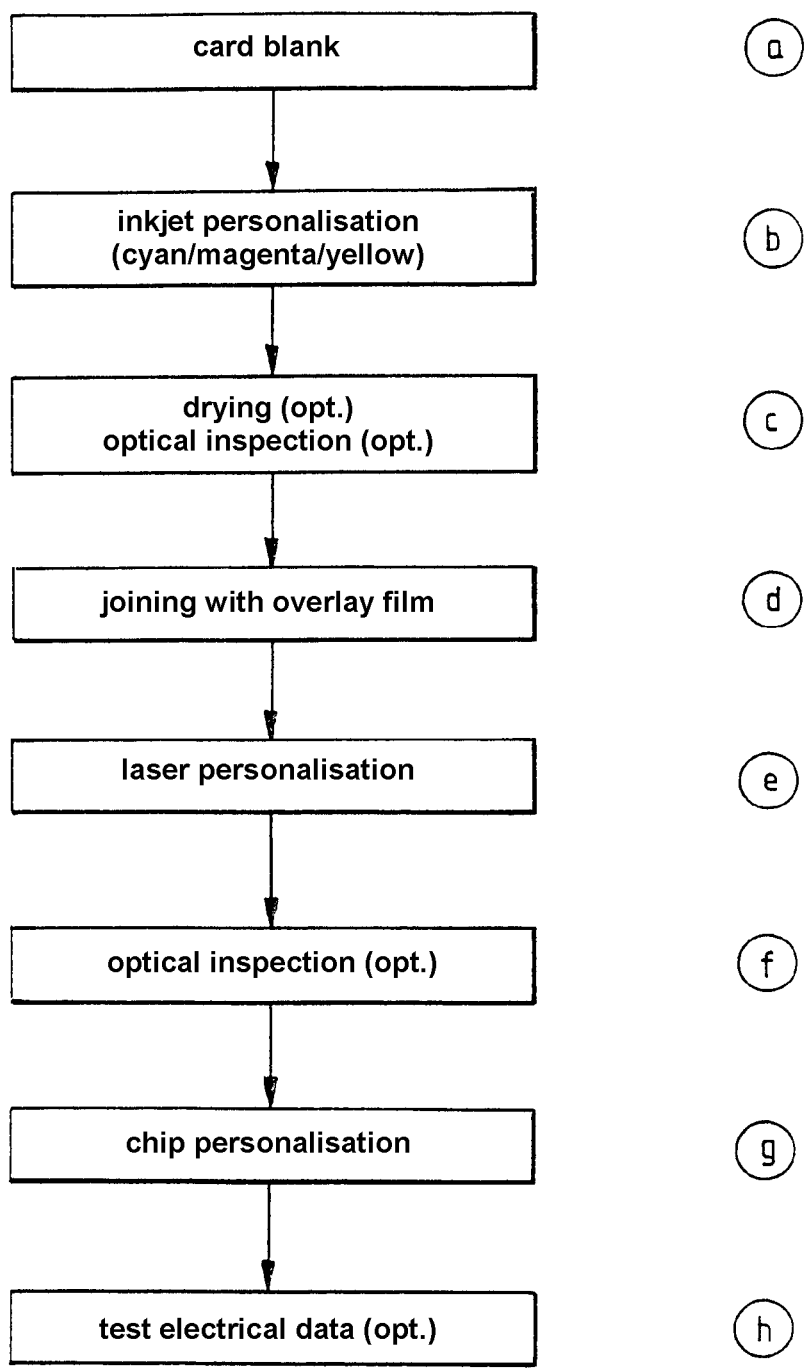
FIG. 1: process sequence of a first variant of the method according to the invention.
Figure 3:
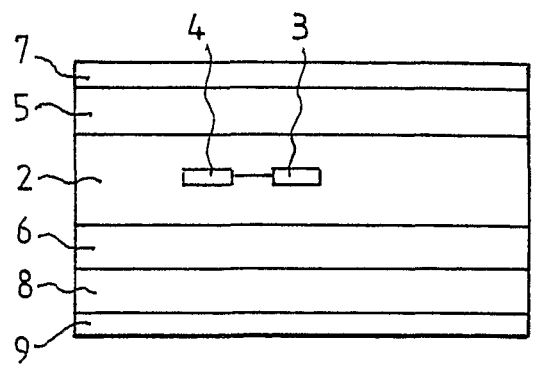
FIG. 3: layer structure of a polymer layer partial composite or document blank.
Figure 4:
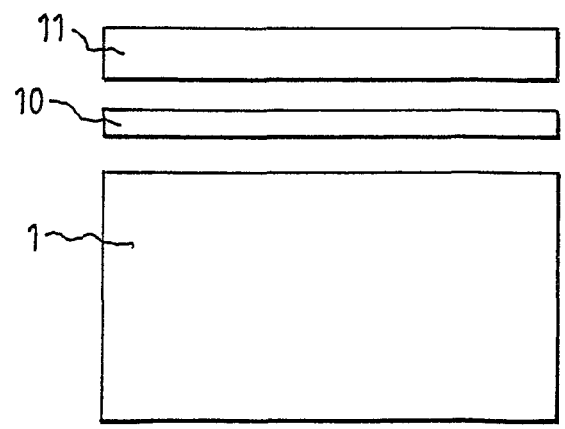
FIG. 4: structure of a completed security and/or valuable document.

In FIGS. 1, 3 and 4 can be seen that in step a) a document blank 1, for instance as shown in FIG. 3, is used. The document blank 1 has in the Example a polymer layer 2 with a thickness of 300 µm with a chip 3 and an antenna 4. On both sides of the polymer layer 2, opaque polymer layers 5, 6 with a thickness of 100 µm are provided, which optionally may each and independently from each other be overprinted on one side or on both sides. On both sides of the polymer layers 5, 6, transparent polymer layers 7, 8 are arranged, which have a thickness of 100 µm. The polymer layer 8 may be imprinted on one side or on both sides. The polymer layer 8 has applied on it a 50 µm thick and transparent polymer layer 9.

Again with regard to the representation of FIGS. 1, 3 and 4, it can be seen that the document blank is provided in step b) on one side with an inkjet printed layer 10 that represents personalized information, for instance as a passport photograph. All colours (for instance with the basic colours cyan, magenta and yellow) and black can be printed. Optionally, in step c) follows a drying process and/or an optical inspection of the inkjet printed layer 10. The optical inspection serves in particular for identifying faults in the inkjet printed layer, for instance by blocked nozzles, for defining the security and/or valuable document as invalid and for initiating another personalization with the respective information. When detecting faults, it is suitable, if before another printing process of document blanks 1, a cleaning cycle or an exchange of the pressure head for the purpose of cleaning or replacement is carried out. In step d), a polymer cover layer 11 is placed on the side of the document blank 1 with the inkjet printed layer and thermally laminated with the document blank 1. The polymer material of the polymer cover layer 11 is compatible with the polymer material in the range of the surface of the document blank 1, if applicable even identical therewith, so that by the lamination a monolithic block of document blank 1 and polymer cover layer 11 is formed. In step e) then follows the integration of further personalized information, for instance name, address, place of birth, date of birth, document number etc., by means of laser engraving. Tilting effects may also belong thereto. In optional step f), an optical control of the laser engraving process may be made. In optional step g) then follows the storage of personalized data in the chip 3. In optional step h) follows an electronic test of the personalized data in the chip 3 and if applicable an inspection of the stored data for concordance with the personalized information of the inkjet printed layer 10 and/or the laser engraving. Finally, a security and/or valuable document is obtained, as shown in FIG. 4. A composite (expanded in the representation) of document blank 1, inkjet printed layer 10 and polymer cover layer 11 can be seen.

If the document as blank 1 is a data page for a multi-page security and/or valuable document, as for instance a passport, then before step a) the pages of the security and/or valuable document are turned, so that the page, to which the inkjet printed layer is to be applied, lies open. Then the steps are carried out, as shown. Thereafter optionally further pages can be turned and a personalization of further pages of the security and/or valuable document can be performed. Further, optionally a serial number can be integrated in all pages of the passport, for instance by means of laser perforation.

EXAMPLE 2: SECOND PRODUCTION PROCESS

Figure 2:
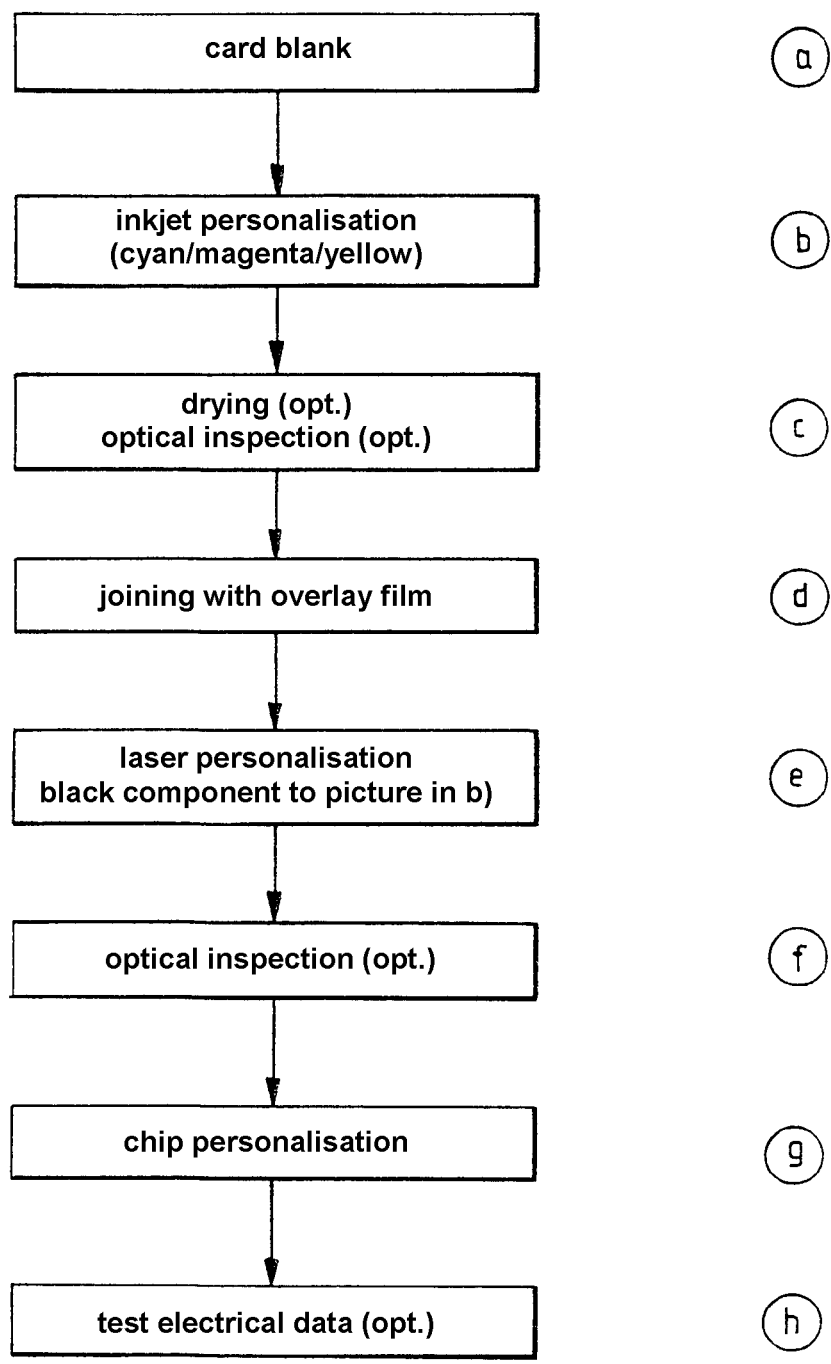
FIG. 2: process sequence of a second variant of the method according to the invention.

In FIG. 2 is shown an alternative production process. It essentially differs from the process of Example 1 in that in step b) an inkjet printed layer without black is printed. During step e), the laser engraving is also carried out by that to the picture produced in step b) the missing black picture elements are added. Thereby a picture is generated, the colored components of which on the one hand and the black components of which on the other hand are arranged in different layers, thereby providing an increased security against manipulations. The remaining structure corresponds to the representations of FIGS. 3 and 4.

EXAMPLE 3: THIRD PRODUCTION PROCESS

In FIG. 5, another production process is shown. It essentially differs from the other processes in that in step e) the laser personalization is carried out even before step b) of the inkjet personalization. The laser personalization may again contain black components of the colored inkjet picture and suitable position marks. This variant has the advantage that by flexible inkjet technology, a precise orientation of the inkjet layer with respect to the laser engraving is obtained, in particular by using a local registration at the inkjet head. The remaining structure corresponds to the representations of FIGS. 3 and 4.

The invention claimed is:

1. A method for producing a security and/or valuable document containing a polymer layer composite or consisting thereof, said polymer layer composite being formed from a polymer layer partial composite comprising a first polymer and a transparent polymer cover layer comprising a second polymer, the polymer layer partial composite and/or the polymer cover layer containing a laser sensitive component, wherein the method comprises
   A) applying first personalized information to the polymer layer partial composite by means of an inkjet printing method as a colored inkjet printed layer,
   B) applying the transparent polymer cover layer to the inkjet printed layer with subsequent joining directly to the polymer layer partial composite by thermal lamination, and either
   C1) inscribing second personalized information into the polymer layer composite of the security and/or valuable document obtained in step B) by means of laser engraving, or
   C2) inscribing second personalized information into the polymer layer partial composite, before one of steps A) or B), by means of laser engraving;
   wherein the first personalized information is a color component without black of a personalized picture, and wherein the second personalized information is a missing black component of the personalized picture such that the color and black components define a complete personalized picture.

2. The method according to claim 1, wherein the polymer cover layer is formed from a polymer with a glass temperature before the lamination of less than 140° C.

3. The method according to claim 1, wherein (a) the polymer layer partial composite and the polymer cover layer are formed from identical or different polymers, (b) the polymer cover layer and optionally the polymer layer partial composite each contain identical or different groups that are reactive with each other, and (c) the reactive groups of the polymer cover layer are reacted with each other and/or the reactive groups of the polymer layer partial composite at a lamination temperature of less than 200° C. and undergo covalent binding with each other.

4. The method according to claim 2, wherein the glass temperature of the polymer cover layer before the thermal lamination is less than 120° C., and wherein the glass temperature of the polymer cover layer after the thermal lamination by reaction of reactive groups of a polymer of the polymer cover layer with each other is at least by 5° C., higher than the glass temperature before the thermal lamination.

5. The method according to claim 3, wherein the lamination temperature in step B) is less than 180° C.

6. The method according to claim 1, wherein the polymers of the polymer partial composite and of the polymer cover layer are identical or different and are formed from a polymer selected from the group consisting of polycarbonate, polyethylene glycol terephthalate, polymethyl methacrylate, thermoplastic polyurethane elastomers, polyethylene, polypropylene, polyimide or poly-trans-isoprene, and copolymers of the foregoing polymers.

7. The method according to claim 6, wherein the polymer partial composite and/or the polymer cover layer are formed from the polycarbonate.

8. The method according to claim 3, wherein the reactive groups for each polymer are selected from the group consisting of —CN, —OCN, —NCO, —NC, —SH, -Tos, —SCN, —NCS, —H, epoxy (—CHOCH$_2$), —NH$_2$, —NN+, —NN—R, —OH, —COOH, —CHO, —COOR, -Hal, -Me-Hal, —Si(OR)$_3$, —SiHal$_3$, —CH═CH$_2$, and COR, wherein R may be a reactive or non-reactive group selected from —H, -Hal, C1-C20 alkyl, C3-C20 aryl, C4-C20 aralkyl, each branched or linear, saturated or unsaturated, optionally substituted, or corresponding heterocycles with one or several, identical or different heteroatoms selected from O, N and S.

9. The method according to claim 3, wherein the reactive groups are connected by a spacer group to the polymer, said spacer group being selected from the group consisting of —(CH$_2$)n-, —(CH$_2$—CH$_2$—O)$_n$—, —(SiR$_2$—O)$_n$—, —(C$_6$H$_{10}$)$_n$—, —(C$_6$H$_{10}$)$_n$—, C$_1$-C$_n$ alkyl, C$_3$-C$_{(n+3)}$ aryl, C$_4$-C$_{(n+4)}$ aralkyl, each branched or linear, saturated or unsaturated, optionally substituted, or corresponding heterocycles with one or several, identical or different heteroatoms selected from O, N and S with n=1 to 20.

10. The method according to claim 1, wherein the polymer layer partial composite contains an electronic circuit, and wherein a third personalized information is stored before, at the same time or after step C) in the electronic circuitry.

11. The method according to claim 1, wherein the polymer cover layer comprises a laser sensitive component.

12. The method according to claim 1, wherein an optical inspection of the colored inkjet printed layer and/or an electronic test of an electronic circuit is made before or after step B) or C).

* * * * *